United States Patent [19]
Schelling

[11] Patent Number: 5,970,265
[45] Date of Patent: Oct. 19, 1999

[54] CAMERA WITH PIVOTABLE COVER-HANDLE

[75] Inventor: Anna Schelling, Geneva, N.Y.

[73] Assignee: Eastman Kodak Company, Rochester, N.Y.

[21] Appl. No.: 09/128,437

[22] Filed: Aug. 4, 1998

[51] Int. Cl.⁶ .................................................. G03B 17/24
[52] U.S. Cl. .......................................... 396/348; 396/448
[58] Field of Search .................................... 396/348, 424, 396/448, 535, 540

[56] References Cited

U.S. PATENT DOCUMENTS

| | | |
|---|---|---|
| D. 293,587 | 1/1988 | Leonard . |
| 515,265 | 5/1894 | Swayze ................................. 396/424 |
| 4,075,642 | 2/1978 | Niggeloh . |
| 4,451,130 | 5/1984 | Yan . |
| 5,845,167 | 12/1998 | Funahashi et al. ..................... 396/448 |

*Primary Examiner*—David M. Gray
*Attorney, Agent, or Firm*—Roger A. Fields

[57] ABSTRACT

A camera comprising a housing having similar length front, rear and bottom walls, and a cover-handle for the housing pivotable between folded and extended positions relative to the housing to uncover and recover at least a taking lens opening in the front wall, is characterized in that the cover-handle has a cavity within which the front and rear walls of the housing are partially located and the bottom wall of the housing is completely located when the cover handle is pivoted to its extended position, in order to provide an extension of the housing that makes the housing more easy to hold.

4 Claims, 4 Drawing Sheets

CAMERA WITH PIVOTABLE COVER-HANDLE

FIELD OF THE INVENTION

The invention relates generally to the field of photography, and in particular to cameras. More specifically, the invention relates to a camera with a pivotable cover-handle.

BACKGROUND OF THE INVENTION

Prior art U.S. Pat. Nos. 4,075,642 issued Feb. 21, 1978 and 4,451,130 issued May 29, 1984 each disclose a pocketable camera comprising a housing having similar length front, rear and bottom walls, and a cover-handle for the housing pivotable between folded and extended positions relative to the housing to uncover and recover a taking lens opening and a viewfinder opening in the front wall. Since the camera is pocketable, it is small and therefore can not be easily held during picture-taking. Thus, the need for the cover-handle.

SUMMARY OF THE INVENTION

A camera comprising a housing having similar length front, rear and bottom walls, and a cover-handle for the housing pivotable between folded and extended positions relative to the housing to uncover and recover at least a taking lens opening in the front wall, is characterized in that:

the cover-handle has a cavity within which the front and rear walls of the housing are partially located and the bottom wall of the housing is completely located when the cover handle is pivoted to its extended position, in order to provide an extension of the housing that makes the housing more easy to hold.

DETAILED DESCRIPTION OF THE INVENTION

Figure 1:
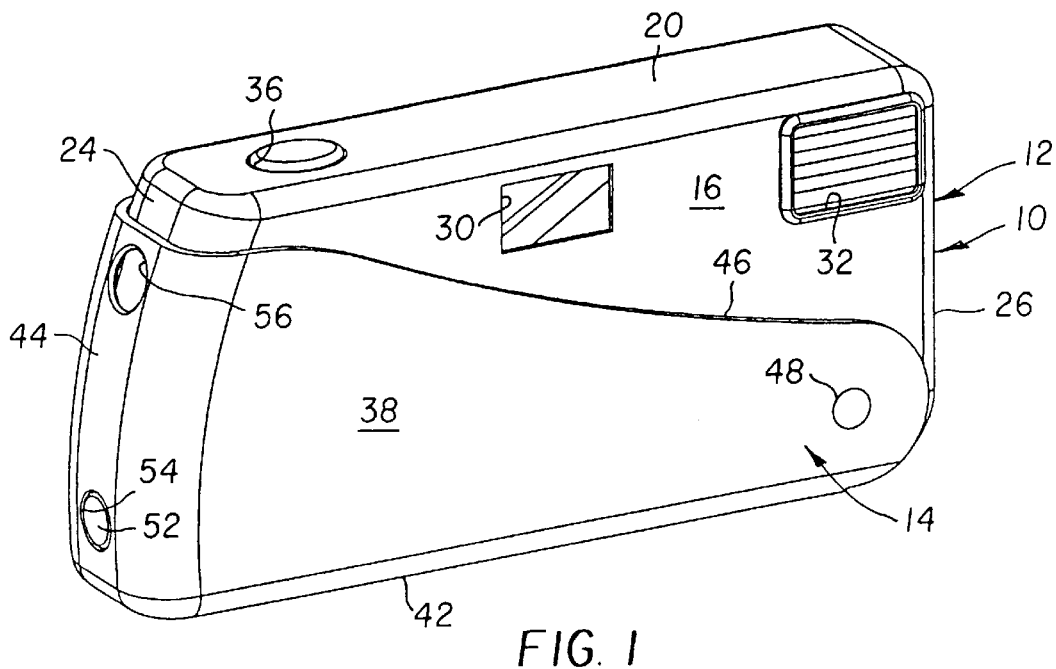
FIG. 1 is a front perspective view of a pocketable camera with a pivotable cover-handle according to a preferred embodiment of the invention, showing the cover-handle in a folded position.

The invention is disclosed as being embodied preferably in a pocketable camera. Prior examples of a pocketable camera are disclosed in U.S. Pat. No. 4,075,642 issued Feb. 21, 1978 and U.S. Pat. No. 4,451,130 issued May 29, 1984. Because the features of a pocketable camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a pocketable camera 10 comprising a housing 12 and a cover-handle 14.

The housing 12 is substantially rectangular-shaped and has similar length front, rear, top and bottom walls 16, 18, 20 and 22 and shorter length opposite end walls 24 and 26. The front wall 16 has a taking lens opening 28, a front viewfinder opening 30 and a flash emission opening 32. The rear wall 18 has a rear viewfinder opening 34. The top wall 20 has a shutter release button opening 36.

The cover-handle 14 has similar length front, rear and bottom walls 38, 40 and 42 and a shorter length end wall 44 that, together, define a cavity 46. A pivot pin 48 connects the housing 12 and the cover-handle 14 to permit pivotal movement of the cover-handle between a folded position, shown in FIGS. 1, 3 and 5, and an extended position, shown in FIGS. 2, 4 and 7.

Figure 3:
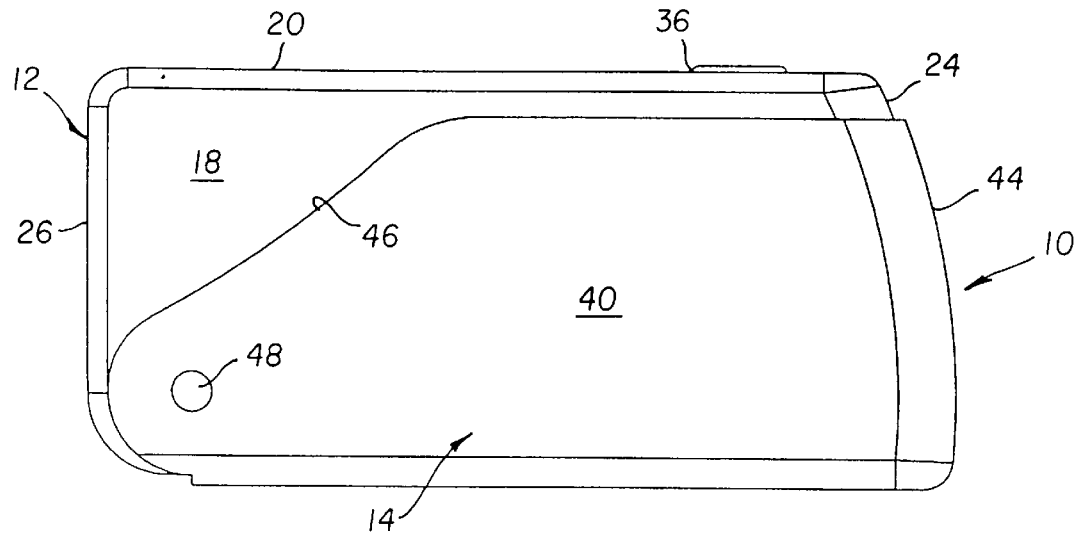
FIG. 3 is a rear elevation view of the pocketable camera, showing the cover-handle in its folded position.

When the cover-handle 14 is in its folded position, as shown in FIGS. 1 and 3, the bottom wall 22 of the housing 12 is completely within the cavity 46 and the front, rear and end walls 16, 18 and 24 of the housing are partially within the cavity. The front wall 38 of the cover-handle 14 covers the taking lens opening 28 in the front wall 16 of the housing 12.

Figure 2:
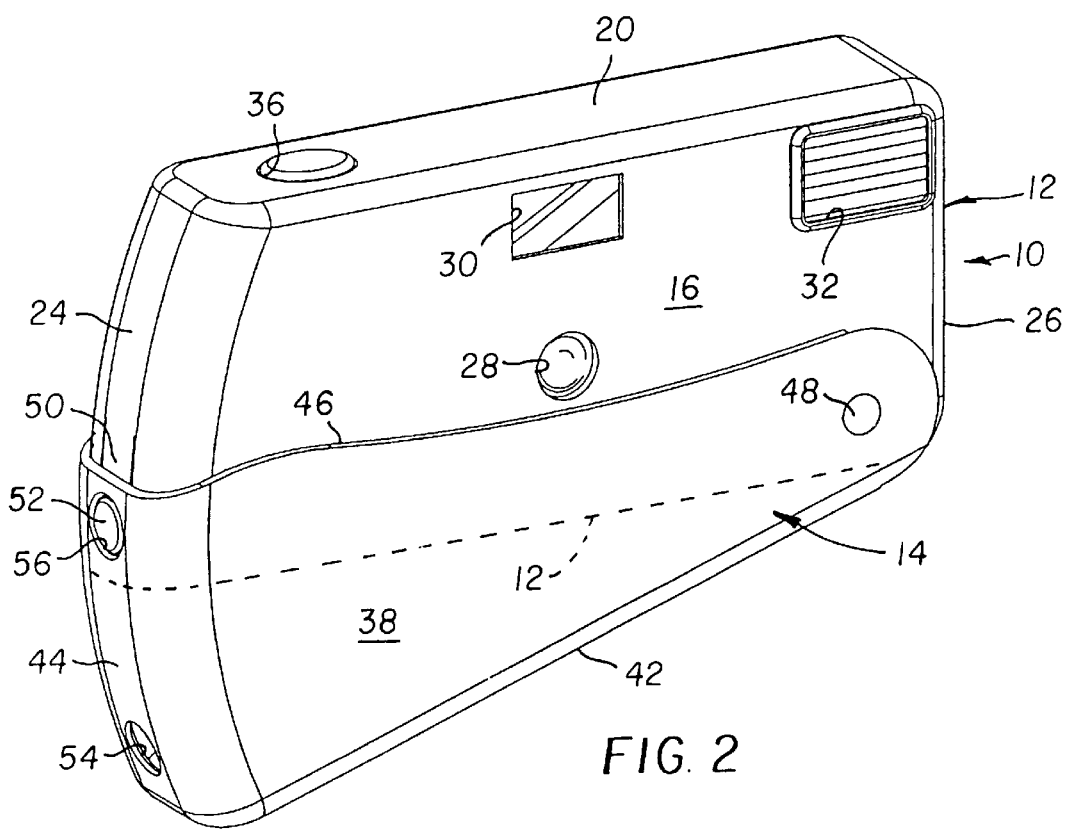
FIG. 2 is a front perspective view of the pocketable camera, showing the cover-handle in an extended position.
Figure 4:
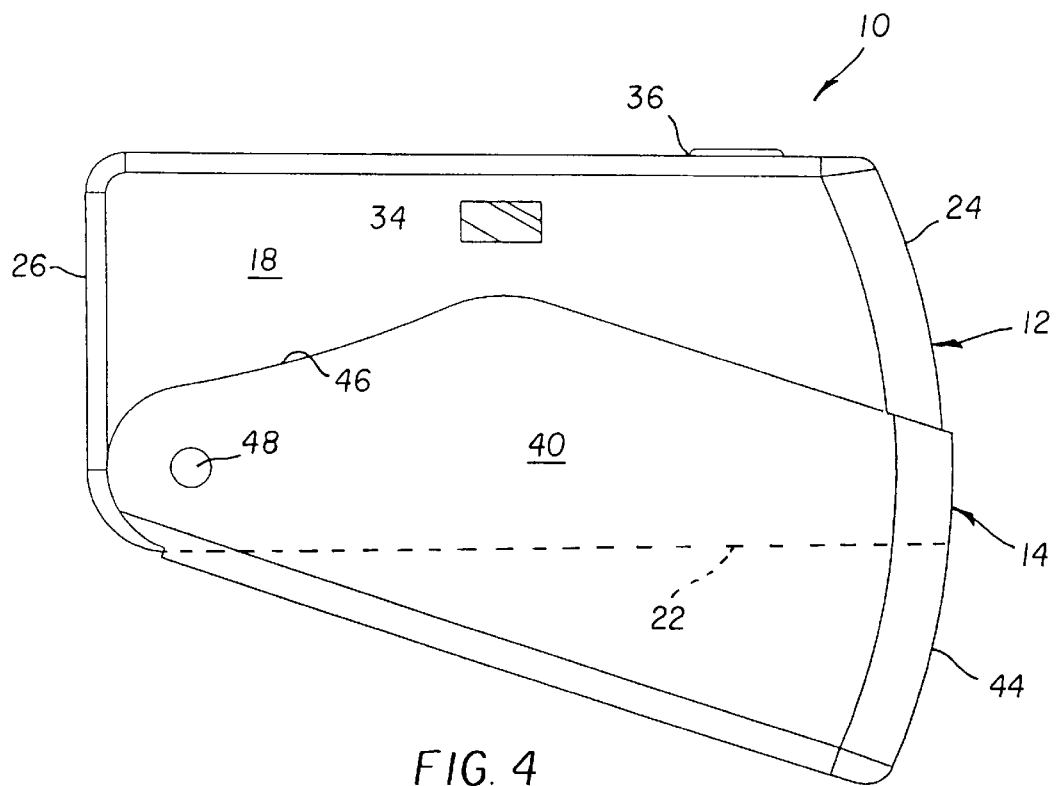
FIG. 4 is a rear elevation view of the pocketable camera, showing the cover-handle in its extended position.

When the cover-handle 14 is in its extended position, as shown in FIGS. 2 and 4, the bottom wall 22 of the housing 12 is completely within the cavity 46 and the front, rear and end walls 16, 18 and 24 of the housing are partially within the cavity. The front wall 38 of the cover-handle 14 has now uncovered the taking lens opening 28 in the front wall 16 of the housing 12.

Thus, the front and rear walls 16 and 18 of the housing 12 are located within the cavity 46 a greater extent when the cover handle 14 is pivoted to its folded position than when the cover handle is pivoted to its extended position. Also, the bottom wall 22 of the housing 12 is located within the cavity 46 the same extent when the cover handle 14 is pivoted to its extended position as when the cover handle is pivoted to its folded position.

Figure 5:
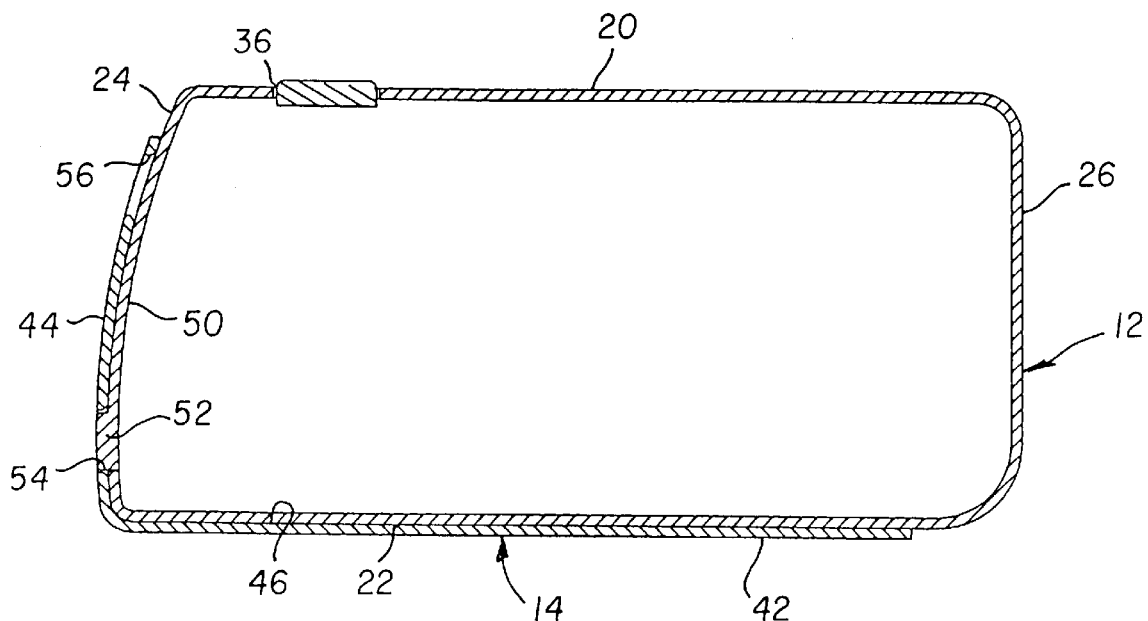
FIGS. 5–7 are section elevation views of a camera housing or shell and the cover-handle; depicting operation of a cantilevered locking button for locking the cover-handle in its folded and extended positions.
Figure 6:
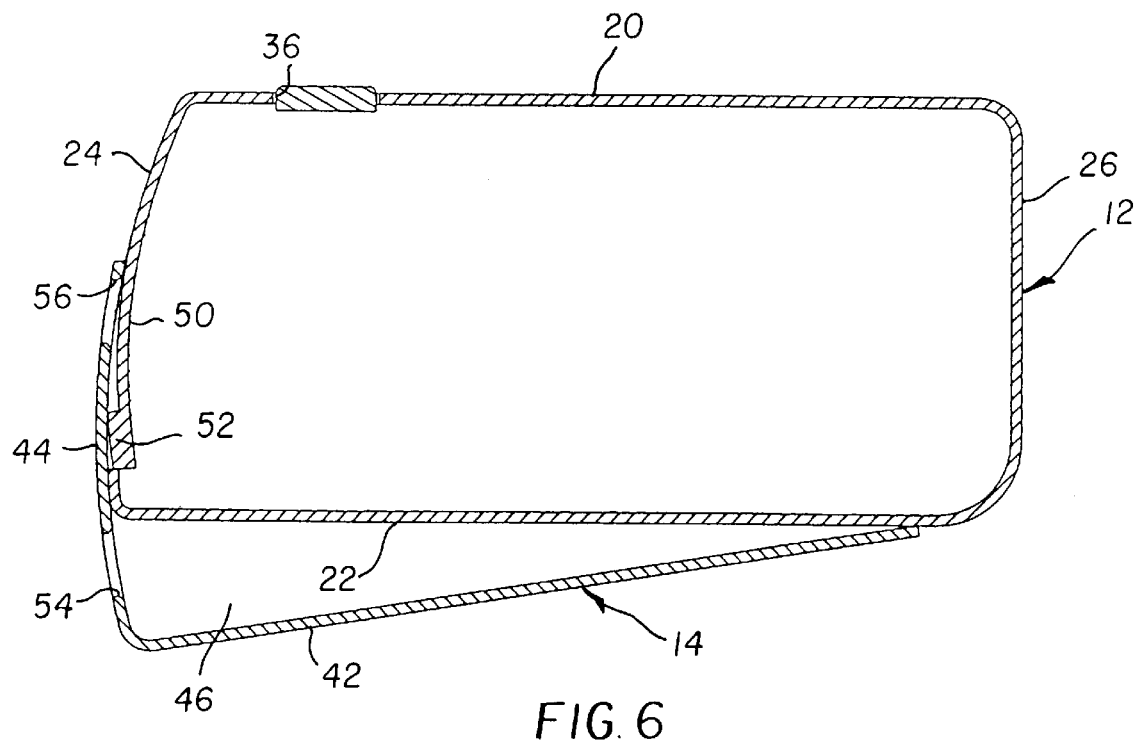
Figure 7:
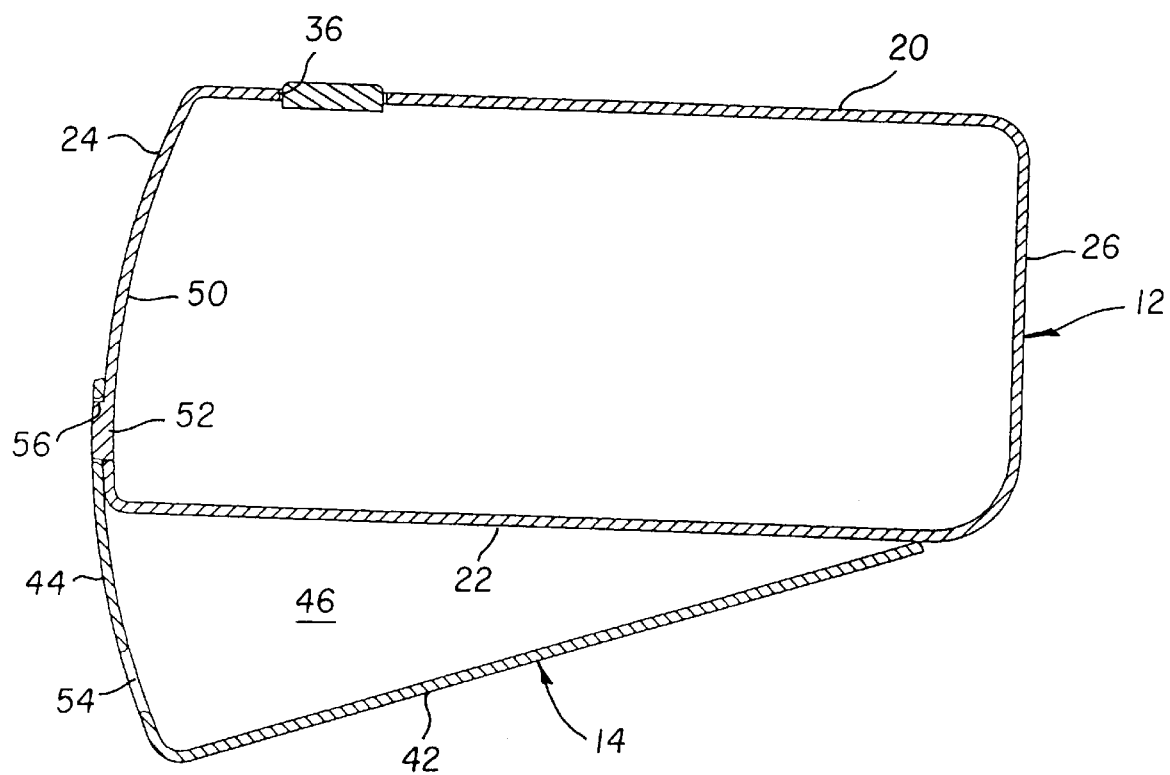

The end wall 24 of the housing 12 has an integral resilient cantilevered portion 50 provided with a locking button 52 at a free end of the cantilevered portion. When the cover-handle 14 is in its folded position, as shown in FIGS. 1 and 5, the locking button 52 is urged into a hole 54 in the end wall 44 of the cover-handle 14 to secure the cover-handle in the folded position. As shown in FIGS. 6 and 7, manually depressing the locking button out of the hole 54 allows the cover-handle 14 to be pivoted counter-clockwise out of its folded position to its extended position. When the cover-handle 14 is in its extended position, as shown in FIGS. 2 and 7, the locking button 52 is urged into a hole 56 in the wall 44 of the cover-handle 14 to secure the cover-handle in the extended position.

The invention has been described with reference to a preferred embodiment. However, it will be appreciated that variations and modifications can be effected by a person of ordinary skill in the art without departing from the scope of the invention.

PARTS LIST 10. pocketable camera
12. housing
14. cover-handle
16. front wall
18. rear wall
20. top wall
22. bottom wall
24. end wall
26. end wall 28. taking lens opening
30. front viewfinder opening
32. flash emission opening
34. rear viewfinder opening
36. shutter release button opening
38. front wall
40. rear wall
42. bottom wall
44. end wall
46. cavity
48. pivot pin
50. cantilevered portion
52. locking button
54. hole
56. hole

What is claimed is:

1. A camera comprising a housing having similar length front, rear and bottom walls, and a cover-handle for said housing pivotable between folded and extended positions relative to the housing to uncover and recover at least a taking lens opening in said front wall, is characterized in that:

said cover-handle has a cavity within which said front and rear walls of said housing are partially located and said bottom wall of the housing is completely located when the cover handle is pivoted to its extended position, in order to provide an extension of said housing that makes the housing more easy to hold, and has a pair of holes; and said housing has a manually depressible locking button urged to enter one of said holes when said cover-handle is pivoted to its folded position and to enter the other hole when the cover-handle is pivoted to its extended position.

2. A camera as recited in claim 1, wherein said front and rear walls of said housing are located within said cavity a greater extent when said cover handle is pivoted to its folded position than when the cover handle is pivoted to its extended position and said bottom wall of the housing is located within said cavity the same extent when said cover handle is pivoted to its extended position as when the cover handle is pivoted to its folded position.

3. A camera as recited in claim 1, wherein said housing and said locking button are an integrally formed single piece.

4. A camera as recited in claim 1, wherein said housing has an end wall including a cantilevered portion, and said locking button projects from said cantilevered portion.

* * * * *